UNITED STATES PATENT OFFICE.

THOMAS C. DILL, OF PHILADELPHIA, PENNSYLVANIA.

POWER-TRANSMISSION MECHANISM.

No. 929,405.  Specification of Letters Patent.  Patented July 27, 1909.

Application filed May 15, 1908. Serial No. 433,063.

*To all whom it may concern:*

Be it known that I, THOMAS C. DILL, a citizen of the United States, residing in Philadelphia, Pennsylvania, have invented certain Improvements in Power-Transmission Mechanism, of which the following is a specification.

One object of my invention is to provide mechanism for transmitting power from a source thereof to some driven device, which mechanism, in addition to frictionally engaging disks or plates pressed together by some yielding device, shall include means whereby the force pressing said disks together shall be variable with the load transmitted.

I further desire to provide improved mechanism for transmitting power between a source thereof and a driven body which shall include means for automatically varying the pressure forcing the disks together, in accordance with variations in the amount of power being transmitted.

Another object of the invention is to so arrange the various parts of a power transmission mechanism employing frictionally engaging plates or disks that it shall be possible to adjust them at will so that the pressure upon the friction plates shall at all times remain constant so as to produce a torque of constant magnitude or, on the other hand, so that the pressure forcing the plates together will vary with the speed.

My invention in addition, contemplates an improved construction of disks whereby the reëngagement of one series of the same with another is facilitated after these disks have been separated, and it is also desired to provide various improvements in the yielding connections and automatic regulating devices whereby the pressure of the disks of one series upon those of the engaging series is governed.

These objects I attain as hereinafter set forth, reference being had to the accompanying drawings, in which:—

Figure 1:
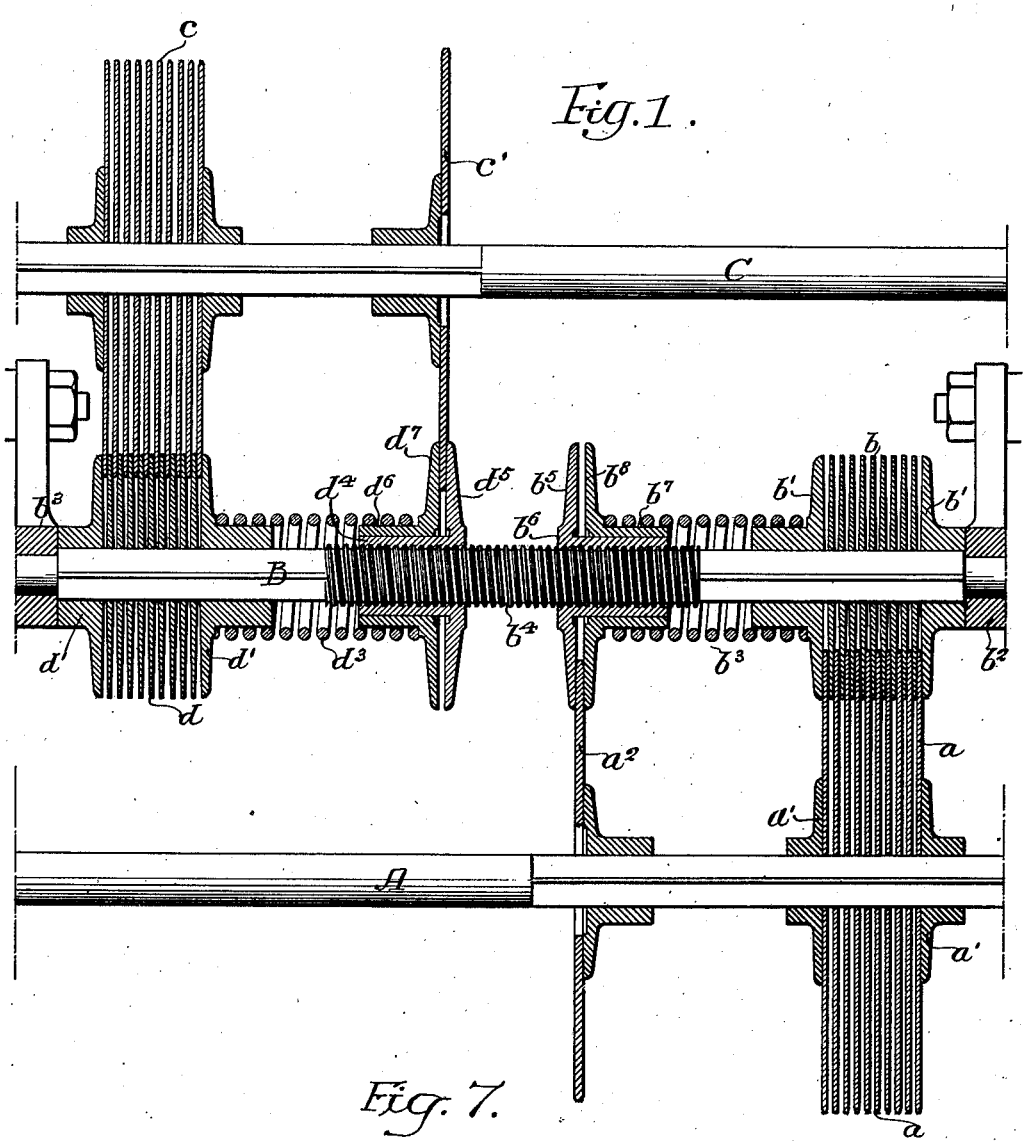
Figure 2:
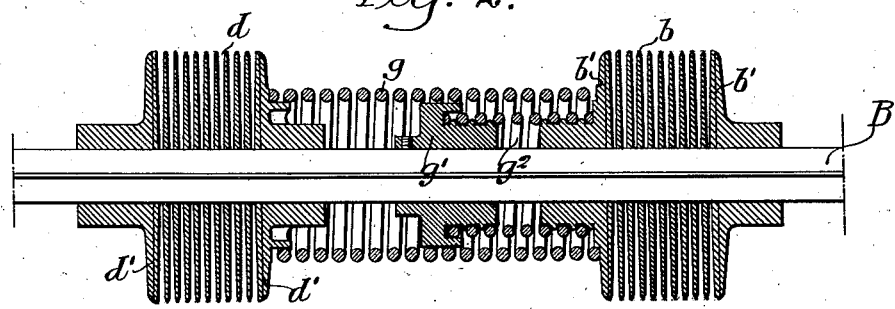
Figure 3:
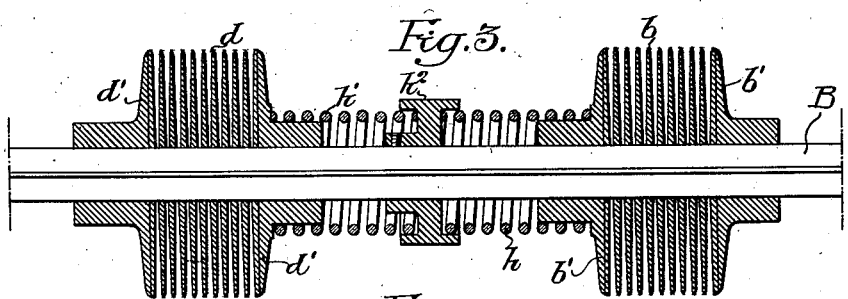
Figure 4:
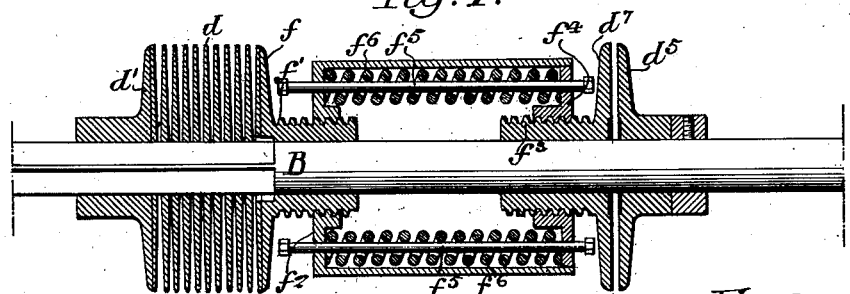
Figure 5:
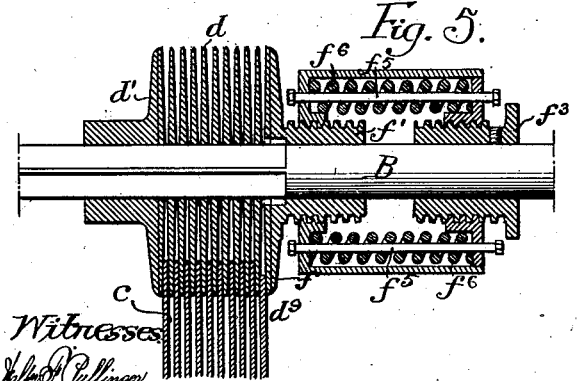
Figure 6:
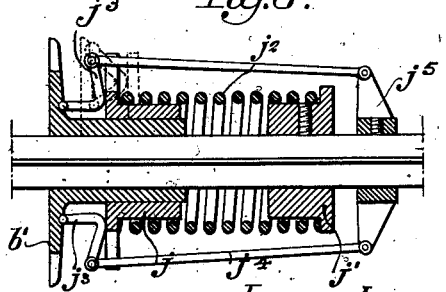

Figure 1, is a plan, showing somewhat diagrammatically and in horizontal section, one embodiment of my invention; Figs. 2 and 3, are longitudinal sections illustrating slightly modified forms of the parts of my invention supported upon the intermediate shaft; Figs. 4 and 5 are longitudinal sections illustrating special forms of the automatically acting means for varying the pressure exerted by one series of disks upon those of another series in accordance with the variations in the power transmitted; Fig. 6, is a longitudinal section illustrating another modified form of automatically acting means for causing the pressure exerted by a spring upon a series of disks to be varied and Fig. 7, is an enlarged section illustrating the preferred form of the disks employed.

Referring to Fig. 1, of the above drawings, A, B, and C represent three substantially parallel shafts, which may be carried in any suitable bearings, and it may be assumed that of these the shaft A is connected to a source of power, while the shaft C is connected to some machine or device for utilizing the power. Upon a squared portion of the shaft A I mount a series of circular plates or disks $a$ which, as they fit upon said shaft, are forced to turn with the same, while being free to slide toward and from each other though it is obvious that they may be splined to the shaft without in any way departing from my invention. For limiting their possible movement away from each other I may, if desired, also place upon the shaft a pair of collars $a'$. Also carried by the shaft A so that it is compelled to turn therewith, but is free to move longitudinally thereon, is a disk $a^2$, which it will be noted, is of somewhat less diameter than the disks $a$; this difference in diameter being determined as noted hereafter. Upon the intermediate shaft B are carried two series of circular plates or disks $b$ and $d$ of which the first series mesh or are capable of meshing with the disks $a$ of the shaft A, while the disks $d$ are similarly capable of engaging alternately or meshing with the disks $c$ of a series loosely mounted upon but compelled to turn with the shaft C. In the present instance the disks $a$ and $c$ consist of substantially parallel faced plates, while the disks $b$ and $d$ taper from points adjacent to their centers to their peripheries;—though, if desired, the disks $b$ may be parallel faced, while the disks $a$ are tapered, and similar changes may be made with the remaining disks on the shafts B and C, so that one set of two intermeshing series of disks is parallel faced, while the other is tapered. In this case there is at each end of the series of disks $b$ a pressure plate $b'$ having a hub on the shaft of such length that it is not possible for it to tilt out of a plane substantially at right angles to the line of the shaft. One of these pressure plates abuts upon a collar $b^2$ on the shaft B, while the other is yieldingly pressed toward the disks and the other pressure plate by means of a spiral spring $b^3$ arranged concentrically with the said shaft. The series of disks $d$ similarly has two pressure plates $d'$, of which one rests against a second collar $b^3$ on the shaft B and the other is engaged by one end of a second spiral spring $d^3$. Between the two sets of disks $b$ and $d$ the shaft B is threaded, as indicated at $b^4$, and upon one end of this threaded portion is mounted a threaded sleeve having fixed to it—integrally in the present instance—a plate or disk $b^5$. Sliding upon the sleeve $b^6$ is a second sleeve $b^7$ having a disk $b^8$ adjacent to the disk $b^5$; the arrangement of parts being such that the disk $a^2$ extends between these two disks $b^5$ and $b^8$. On the second part of the threaded shaft B is another sleeve $d^4$ having an integral disk $d^5$ and serving to slidingly support a second sleeve $d^6$, which in turn has a disk $d^7$. The spring $d^3$ in this case engages the disk $d^7$ so as to force it toward the disk $d^5$, while similarly the spring $b^3$ presses the disk $b^8$ toward the disk $b^5$ so as to frictionally grip the disk $a^2$. On the shaft C is a single disk $c'$, which like the disk $c$, is free to slide upon but necessarily turns with the shaft and which extends between the two disks $d^5$ and $d^7$. This disk $c'$ is of slightly greater diameter than the disks $c$ of the series on the shaft C.

Under operating conditions, it is obvious that when power is transmitted from one shaft to another through two series of intermeshing disks there is a certain amount of slip which depends upon the load carried and also upon the spring pressure tending to force the disks into frictional engagement with each other. If, therefore, the springs $b^3$ and $d^3$ be so designed that with a given load there is a definite slip, say of 2% between the disks $a$ and $b$ on the one hand and between the disks $d$ and $c$ on the other, then the disk $a^2$ is made with its diameter 2% less than that of the disks $a$ while the disk $c'$ has a diameter 2% greater than that of the disk $c$. As a consequence under normal conditions the shaft B is driven from the shaft A at a speed substantially 2% less than that of said driving shaft, but inasmuch as the diameter of the disk $a^2$ is 2% less than that of the diameter of the disk $a$, said disk $a^2$ is driven at a speed which is practically identical with that of the two disks $b^5$ and $b^8$. Similarly, since the speed of the shaft C is 2% less than that of the shaft B owing to the slip between the disks $d$ and $c$, the speed of the disks $d^5$ and $d^7$ on the one hand is the same as that of the disk $c'$ owing to their 2% difference in diameter. If, now, there is an increase in the load driven from the shaft C so that the amount of power required to be transmitted is increased, the slip between the disks $a$ and $b$ would be greater than 2% and as a result the speed of the pair of disks $b^5$ and $b^8$ is less than that of the disk $a^2$. As a consequence, the sleeve $b^6$ is driven at a higher speed than is the shaft B so that the spring $b^3$ is compressed by movement of said sleeve upon the threaded part of the shaft toward the pressure plate $b'$. The force pressing together the disks being thus increased, the slip is immediately diminished to its normal amount, the spring pressure being just sufficient to transmit the necessary power with the predetermined amount of slip. In order that the pressure may be reduced in the event of a falling off of the power transmitted, I preferably make the disk $a^2$ somewhat less than 2% smaller in diameter than the disk $a$ so that there is a constant tendency for the disks $b^5$ and $b^8$ to move longitudinally relatively to the shaft B so as to reduce the pressure on the pressure plate $b'$. As soon, however, as this results in an increased slip between the disks $a$ and $b$ the above described series of operations occurs just as if there had been an increase in load with the result that the pressure between the disks is again increased and the slip brought to the normal amount.

While there is theoretically a constant increase and diminution of the pressure between the disks even when the load is constant, as a matter of actual fact the parts assume intermediate positions so that the slip is maintained at the desired point or is quickly brought thereto after a fluctuation of the load. The same sequence of operations occurs with the disks $b$ and $c$ and their pressure-governing disks $d^5$, $d^7$ and $c'$; the latter of these being of a diameter somewhat greater than 2% more than the disks $c$, in order that there shall be a continual slackening off of the pressure exerted upon the pressure plate $b'$, which is continually brought back to the position necessary to maintain the slip at the desired point, as above described.

In Fig. 4, I have shown a modification of the construction illustrated in Fig. 1, in which arrangement of parts I employ one disk $f$ of the series $d$ as a pressure plate, providing it with a threaded portion $f''$ upon which is mounted a correspondingly threaded nut $f^2$. Similarly, I provide one of the two governing disks of the shaft B with a threaded portion $f^3$ and place on this a correspondingly threaded nut $f^4$. These two nuts $f^2$ and $f^4$ I connect by two or, in fact, any desired number of bars or rods $f^5$ and place around these suitable pressure springs $f^6$. The threads upon the hub or sleeve $f''$ are pitched in a direction opposite to that of the threads $f^3$ so that with the parts arranged as before, that is, with the disk $c'$ engaging the two disks $d^5$ and $d^7$ and a series of disks $c$ engaging the disks $d$, any variation in the slip will result in a turning of the disk with the threaded part $f^3$ relatively to the sleeve $f''$ so that the nuts $f^2$ and $f^4$ are forced apart or drawn together with a resulting variation of the pressure exerted upon the intermeshing disks $d$ and $c$. In Fig. 5, I have shown a still further modification of this same idea, though in this case I have materially simplified the construction and reduced the number of parts by making one or more of the disks $d^9$ of the main series of a diameter different from that of the remainder of the disks $c$ (in the present instance less) and place this so that it engages the pressure plate $f$. In this case the sleeve $f^3$, while being threaded, as before, is rigidly fixed to the shaft B and inasmuch as this and the sleeve $f'$ are oppositely threaded, any variation from the predetermined amount of slip will cause movement of the pressure plate $f$ with its sleeve $f'$ toward or from the fixed sleeve $f^3$ with consequent increase or diminution of the pressure exerted by the springs $f^6$ upon the disks $c$ and $d$.

When it is desired that the disks shall be capable of transmitting a constant, or but slightly varying amount of power I may arrange them upon the shaft B as illustrated in Fig. 2, in which case the disks $b$ and $d$ have extending between them a spring $g$. With this arrangement of parts it will be understood that the shaft B is, as shown in Fig. 1, mounted parallel with the shafts A and C so that its disks $b$ mesh with the disks $a$ on the first of these shafts, while its disks $d$ mesh with the disks $c$ on the second shaft. If, now, the shaft B be moved by any suitable device, such as that described and claimed in my U. S. Patent No. 877,491, dated January 28, 1908, toward the shaft A which, as before noted, is assumed to be the driving shaft, the disks $a$ project farther between the disks $b$, and since these are tapered spread them apart so as to compress the spring $g$. This should result in an increased pressure being brought to bear upon the two sets of disks $d$ and $c$, but inasmuch as the movement of the shaft B toward the shaft A results in a corresponding movement away from the shaft C, the disks $d$ and $c$ become less deeply engaged by an amount corresponding almost exactly with the increase of engagement between the disks $a$ and $b$. Inasmuch, therefore, as the spring $g$ is common to each of the disks the force exerted by it remains constant and it is not either compressed or permitted to expand by any change of position of the shaft B toward or from the other two shafts. In this particular instance I mount upon said shaft B at some point between the two sets of disks $b$ and $d$ a collar $g'$ and confine between this collar and the pressure plate $b'$ an auxiliary spring or springs $g^2$, fixing its ends respectively to said collar and to said plate $b'$, so that after the pressure plates $b'$ have been moved toward each other a predetermined distance under the action of the spring $g$, any further movement will be opposed by the auxiliary spring. As a result the force tending to press the disks $b$ toward each other and into engagement with the disks $a$, will, with this arrangement, remain constant up to a certain point, as the pressure plates $b'$ are moved together, after which it will be diminished. Similarly, after said plates have been moved apart a predetermined distance as above explained, any further movement is opposed by the compression of the auxiliary spring $g^2$. It is to be understood that this auxiliary spring may be omitted if desired without departing from my invention.

In the case illustrated in Fig. 3, I have provided each of the series of disks $b$ and $d$ with a separate pressure spring $h$ and $h'$, there being fixed to the shaft B a collar $h^2$ serving as an abutment for one end of each of the springs while their other ends, as in the case of the springs $b^3$ and $d^3$ shown in Fig. 1, engage the pressure plates $b'$, $d'$. In some cases this collar $h^2$ may be loose on the shaft—so that the device operates as does that illustrated in Fig. 2.

In case it should be desired to so move the shaft B that either set of its disks $b$ or $d$ shall be moved completely out of engagement with the corresponding series of disks $a$ and $c$, I so form the edges of the disks that they may readily reëngage with one another. In such case I place between each pair of disks $a$, as well as between each of the disks $b$ small washers or collars $k$ whereby these are held or spaced apart when the disks of one series are out of engagement with those of the other. In addition, the edge of each disk is given a double bevel, as shown in Fig. 7, so that when the disk-supporting shafts are moved toward each other to cause reëngagement of the disks this construction of the edges insures that they shall be properly alternated with one another.

In Fig. 6, I have illustrated a still further modification of my invention which is designed to cause the force pressing together the disks of a series to remain substantially constant even though the said disks are widely separated or permitted to approach together, as by variations in the depth of engagement of a second set of disks with them. For this purpose I provide one of the pressure plates, as $b$, with a collar $j$ slidably mounted upon it and also mount on the shaft a second collar $j'$. Connecting these two is a compression spring $j^2$ and between the collar $j$ and the back pressure plate $b'$ I place a pair of bell-crank levers $j^3$ attaching these through links $j^4$ with the collar $j^5$ or with some other structure fast on the shaft.

As shown in the figures, the arrangement of parts is such that when the pressure plate $b'$ is at its maximum distance from the fixed collar $j$ or from the link-carrying collar $j^5$, the bell crank levers $j^3$ are confined between the collar $j$ and the back of the pressure plate so as to transmit the force of the spring $j^2$ directly to said pressure plate and hence to the various intermeshing disks. When the pressure plate $b'$ is moved toward the collar $j'$ so as to compress the spring $j^2$, the levers $j^3$, being held by the links $j^4$ at a fixed distance from the collar $j^5$, are so turned on the pivots connecting them to the ends of the links that they transmit to said links a portion of the force exerted by the spring $j^2$, and I so design the parts that the amount of force so transmitted to the links is equal to the increased pressure exerted by the spring $j^2$ due to its compression by the above assumed movement of the pressure plate. As a result the force exerted by the spring upon the pressure plate $b'$ remains constant even if said spring be materially compressed.

I claim:

1. A power transmission mechanism including two shafts, intermeshing friction disks on the shafts for operatively connecting the same, means for pressing the disks together, and means operated when the slipping of one disk or set of disks occurs for automatically governing the pressure exerted upon the disks.

2. A power transmission mechanism including two shafts, intermeshing friction disks respectively carried by the shafts for transmitting power from one to the other, resilient means acting upon certain of the disks to press them together, and a disk actuated device for automatically governing the pressure exerted by said resilient means.

3. The combination of two shafts, series of disks on said shafts respectively intermeshing with each other, a spring for pressing together said disks, and a disk or disks arranged to cause the pressure exerted by the spring to vary with the power transmitted.

4. The combination of two shafts, series of intermeshing disks respectively carried by said shafts, a spring pressing together said disks, and a governing disk or disks on each shaft, said latter disks being arranged to coöperate with one another to cause variation of the pressure exerted by said spring.

5. The combination of three shafts, two series of disks on one of the shafts, and a single series of disks on each of the other shafts, each meshing with the disks of one of the series on the other shaft, means for yieldingly pressing together the disks to cause power to be transmitted between intermeshing disks, and means for automatically varying the pressure exerted by said pressing means.

6. The combination of two shafts, series of disks on each shaft respectively intermeshing with each other, a spring pressing the disks together, and governing disks for automatically varying the pressure exerted by said spring, one of said governing disks being constructed to have at the point of its engagement with its coöperating disk or disks a speed different from that of the other disks carried on the same shaft.

7. The combination of two shafts of which one has a threaded portion, a series of disks on each of said shafts, the disks of one shaft meshing with those of the other, resilient means for pressing said disks together, a threaded structure mounted on said shaft and operative on said resilient means, a governing disk for said structure, and a second governing disk coöperating with said first governing disk for automatically causing movement of said threaded structure and consequent variation of the pressure exerted by said resilient means.

8. A power transmission mechanism including two shafts, intermeshing friction disks on the shafts for operatively connecting the same, means for pressing the disks together, and means arranged to transmit a portion of the total power transmitted by the mechanism, for automatically governing the pressure exerted upon the disks.

9. The combination of three shafts, two series of disks on one of the shafts, a series of disks on each of the other shafts meshing with the disks of the first shaft, means for resiliently pressing together the intermeshing disks, and automatically acting governing means for varying the force pressing together the disks of each two intermeshing series in accordance with the variations in the amount of power transmitted.

10. The combination of two shafts, one movable toward and from the other, disks on each shaft respectively meshing with each other, means for pressing the disks together, and means for preventing the disks of one series approaching each other nearer than a predetermined distance.

11. The combination of two shafts, one movable toward and from the other, a plurality of disks on one shaft, a disk or disks on the other shaft meshing therewith, means for pressing together the disks, and means for maintaining said pressure substantially constant irrespective of the depth of engagement of the disks.

In testimony whereof, I have signed my name to this specification, in the presence of two subscribing witnesses.

THOMAS C. DILL.

Witnesses:
   WILLIAM E. BRADLEY,
   WM. A. BARR.